United States Patent [19]

Theiler

[11] 4,315,015
[45] Feb. 9, 1982

[54] PROCESS FOR PREPARING COOKED BACON HAVING REDUCED LEVELS OF N-NITROSAMINES

[75] Inventor: Richard F. Theiler, Scottsdale, Ariz.

[73] Assignee: Armour and Company, Phoenix, Ariz.

[21] Appl. No.: 196,816

[22] Filed: Oct. 14, 1980

[51] Int. Cl.³ .......................... A23B 4/02; A23B 4/14
[52] U.S. Cl. .................................. 426/266; 426/281; 426/332; 426/641; 426/652
[58] Field of Search ............... 426/264, 265, 266, 281, 426/332, 335, 533, 641, 646, 650, 652

[56] References Cited

U.S. PATENT DOCUMENTS

| | | |
|---|---|---|
| 2,770,550 | 11/1956 | Hall et al. |
| 2,863,777 | 12/1958 | Dekker |
| 2,902,369 | 9/1959 | Komarik |
| 2,974,047 | 3/1961 | Holmes ............................ 426/264 |
| 3,901,981 | 8/1975 | Draudt ........................... 426/332 X |
| 3,966,974 | 6/1976 | Bharucha et al. .................... 426/265 |
| 4,112,133 | 9/1978 | Rao et al. ........................ 426/652 X |
| 4,250,199 | 2/1981 | Underwood et al. ........... 426/652 X |

FOREIGN PATENT DOCUMENTS 411006 5/1934 United Kingdom ................ 426/266

OTHER PUBLICATIONS

Red Snow Products Technical Directory, 1-32.
Gorbator et al., "Liquid Smokes For Use In Cured Meats," Food Technology, vol. 25, (1971, pp. 71-77.
Booth et al., "A New Approach to Wood Smoke Flavoring," Food Trade Review, 6-1971, pp. 25, 26 and 32.
Knowles et al., "Nitrosation of Phenols In Smoked Bacon," Nature, vol. 24, 6-1974, pp. 672-673.
Knowles et al., J. Sci. Fd. Agric., 1975, 26, pp. 189-196.
Knowles et al., J. Sci. Fd. Agric., 1975, 26, pp. 267-276.
Davies et al., "Catalytic Effect of Nitropophenols on N-Nitrosamine Formation," Nature, vol. 266, 1977, pp. 657-658.

Primary Examiner—Arthur L. Corbin
Attorney, Agent, or Firm—Frank T. Barber

[57] ABSTRACT

A process for preparing cured bacon which when cooked for consumption contains substantially reduced levels of N-nitrosamines. The process comprises the steps of preparing a nitrite-stable injectable curing solution containing a nitrite, a liquid smoke and a reducing sugar, injecting the curing solution into a green belly, and processing said belly to effect curing.

15 Claims, No Drawings

PROCESS FOR PREPARING COOKED BACON HAVING REDUCED LEVELS OF N-NITROSAMINES

This invention relates to a process for preparing bacon and, more particularly, to a process for preparing bacon which, when cooked, will have reduced levels of N-nitrosamines.

BACKGROUND OF THE INVENTION

For many years it has been common practice to prepare cured bacon by treating green (uncured) bellies with a curing solution (hereinafter "pickle") and then smoking the cured bacon to impart a desirable flavor. A major component of the pickle is sodium nitrite which inhibits the germination of *Clostridium botulinum* spores, thus ensuring that the cured bacon will be free of the deadly toxin produced by this bacterium. In recent years, however, much controversy has surrounded the use of sodium nitrite because there have been allegations that residual nitrite from the pickle can react with organic amines present in various cured pork products to form carcinogenic nitrosamines. This problem is accentuated with bacon because nitrosamine formation is induced by the elevated temperatures encountered when the bacon is cooked for consumption; i.e., those exceeding 300° F.

Many approaches have been considered in seeking a remedy to this problem and proposed remedies have included eliminating nitrite from the pickle or reducing residual nitrite levels in the cured product. Neither of these approaches a particularly satisfactory, however, because there is presently no suitable substitute for nitrite, and because reducing nitrite levels could increase the likelihood that *C. botulinum* spores would grow in the cured bacon.

Conventional pickle also contains a number of ingredients in addition to sodium nitrite. These include buffering agents such as sodium tripolyphosphate to stabilize the nitrite, agents to facilitate curing such as sodium erythorbate or ascorbic acid, sodium chloride and flavoring agents such as brown sugar or synthetic flavors. In certain instances the buffer can be particularly useful because sodium nitrite is unstable in the presence of acid. For example, a pickle having a pH of 6.7 will show essentially no depletion of nitrite after 24 hours whereas pickle having a pH of 5.9 can show a 60% decrease in nitrite after 24 hours. The advantages and disadvantages of using buffers in pickles containing nitrite are well documented in the art.

Cured bacon has typically been prepared by immersing green bellies in picle or by injecting the pickle directly into the green bellies. Commercial procedures most commonly involve injection of the bellies because the curing process can be rapidly and efficiently completed. When cured in this way, a quantity of pickle usually consituting 8-15% of the weight of the meat is injected; thus, for example, if a 7-kilogram belly were pumped (i.e., injected) with pickle at the level of 10%, a quantity of 700 grams of pickle would be used.

Traditionally, cured bellies were smoked by exposing them to direct smoke in a smokehouse; however, the direct smoking of meat has a number of disadvantages and recent years have seen the development of a variety of liquid smoke compositions which are now in wide use. A number of U.S. patents disclose procedures for preparing and applying such products. For example, in U.S. Pat. No. 3,106,473, C. M. Hollenbeck describes a process for preparing an aqueous liquid smoke by counter current extraction of wood smoke; in U.S. Pat. No. 3,445,248, K. Miler et al. describe a method for preparing a refined liquid smoke extract suitable for use in sausage; in U.S. Pat. No. 3,480,446, C. M. Hollenbeck describes a method for preparing a smoke-flavored edible oil by extracting an aqueous smoke solution with oil; and in U.S. Pat. No. 3,523,802, R. H. Wandel et al. describe a process for preparing an aqueous liquid smoke particularly applicable to superficially treat hot dogs and smokey links, the liquid smoke being prepared by treating an aqueous smoke solution with a non-toxic oxidizing agent in order to destroy certain color-forming constituents of the smoke.

The basic composition of several liquid smokes has been extensively investigated and it is reported that they contain three basic classes of components: acids, phenols and carbonyl compounds, all of which contribute to the flavor and color characteristics of smoke products. The phenols, which are acidic in nature, and the acids account for the low pH of liquid smoke, which is generally on the order of 2 to 3. Furthermore, the phenols contribute greatly to the smokey flavor imparted by the liquid smokes. The carbonyl compounds, which are more neutral, constitute a major portion of the color-forming components. These components give the meat surface a desirable brownish smoke color when the liquid smoke is applied by spraying or atomization.

Liquid smokes have found wide commercial acceptance. Those used most often are generally either aqueous or non-aqueous (oil based) solutions, although powdered forms of liquid smokes are also available. Examples of such smokes are CharSol which is an aqueous solution of hardwood smoke that has been processed to remove particulate matter; CharOil which is a vegetable oil extract of CharSol; and CharDex, which is a malto-dextrin that has been treated with CharSol and spray dried. These products are produced by Red Arrow Products Company. CharSol and CharOil are primarily used for surface applications to pork products and for direct addition to sausage products, whereas CharDex is primarily useful for addition to meat products that cannot tolerate added moisture, such as certain sausage products.

The technical literature distributed by Red Arrow indicates that CharSol and CharDex may be added to curing solutions which do not contain nitrite, and that the resulting solutions can be pumped without difficulty. However, such liquid smokes have not been successfully added to curing solutions containing nitrite and pumped on a commercial basis. There are a number of reasons for this, many of which are associated with the physical character of such compositions.

Liquid smoke is acidic in nature and the nitrite in the pickle is acid sensitive. Accordingly, if liquid smoke is added to the pickle, it is necessary to buffer the pickle with compounds such as sodium tripolyphosphate in order to avoid the liberation of nitric oxides. Although buffering can overcome that problem, it raises the pH so that certain components of the liquid smoke, particularly the phenolic compounds, tend to separate from the aqueous phase. Such precipitated matter tends to cause plugging of the injection needles and the non-homogeneous nature of the mixture makes it virtually impossible to uniformly inject the bellies.

In addition, there is also another reason for excluding liquid smokes from the pickle. Liquid smokes contain significant levels of phenols and there have been recent suggestions in the scientific literature that phenols will enhance the rate at which organic amines are nitrosated. For example, R. Davies and D. J. McWeeny in Nature 226, 657 (1977) stated "It therefore seems that at suitable concentrations the presence of phenols can lead to an enhancement of the rate of nitrosamine formation". Thus, the addition of liquid smoke to the curing pickle might be expected to increase N-nitrosamine levels. This factor, in combination with the other disadvantages noted above made it clear at the time the present invention was made that the problems associated with incorporating liquid smoke into pickle containing nitrite outweighed any advantage that might be derived.

The material which was traditionally added to pickle in order to impart desirable flavor characteristics was brown sugar. However, in recent years, cost factors have mitigated against the use of brown sugar and it has been replaced with dextrin flavoring agents which impart a brown sugar taste.

Brown sugar is unrefined sucrose, a sugar which will not react with mild oxidizing agents such as Fehling's solution, Tollen's Reagent or Benedict's solution; i.e., it is a non-reducing sugar. Reducing sugars such as glucose, maltose, fructose and lactose have also been added to certain food products but they have not been widely used in meat products. In meat, reducing sugars tend to undergo a browning reaction with the amines present in the meat, and they also tend to decompose when heated. Furthermore, when reducing sugars are present a relatively high levels (i.e., more than 1%), the browning and decomposition tend to adversely affect flavor and make the meat appear charred when it is cooked.

I have discovered a method whereby green bellies can be pumped with a specially modified pickle containing liquid smoke and one or more reducing sugars. Moreover, I have discovered, to my surprise, that the resulting bacon contains reduced levels of N-nitrosamines, while at the same time the levels of residual nitrite present in the uncooked cured product remain relatively unaffected, thus ensuring that the germination of *C. botulinum* spores will be prevented. In addition, if the levels of reducing sugar are properly selected so as to minimize browning and charring, the flavor of the product when cooked for consumption is remarkably improved.

Accordingly, one object of the present invention is to provide a process to prepare a cured bacon product which will be safe from contamination by deadly *C. botulinum* toxin.

A second object of the present invention is to provide a process for preparing cured bacon which, when cooked for consumption, will contain relatively low levels of the N-nitrosamines which are alleged to be carcinogens.

Still another object of the present invention is to prepare cured, smoked bacon which, while meeting the aforementioned objectives, will have enhanced flavor characteristics and thus will be more acceptable to consumers when cooked for consumption.

These and other objects of the invention will become apparent from the detailed descriptions of preferred embodiments which follow.

DETAILED DESCRIPTION OF PREFERRED EMBODIMENTS

The present invention concerns my discovery that cured bacon which will have substantially reduced levels of N-nitrosamines when cooked for consumption can be prepared by injecting green bellies with a nitrite-stable curing solution comprising nitrite-containing pickle, liquid smoke in concentration to provide 5 to 400 ppm phenolic constituents and 10 to 2000 ppm carbonyl compounds based on the weight of the green bellies, and 150 to 10,000 ppm of at least one reducing sugar based on the weight of the green bellies. Following injection, the bellies are processed to effect curing.

Reducing sugars are those sugars which will reduce mild oxidizing agents such as Fehling's solution, Tollen's Reagent and Benedict's solution, and examples of such sugars are glucose, maltose, fructose and lactose. At the time of the present invention reducing sugars were not known to have any effect on N-nitrosamine formation although certain aldehydes had been found to encourage N-nitrosamine formation under experimental conditions. For example, T. Kunechi et al., *Fd. Cosmet. Toxicol.*, 18, 119 (1980) reported that 0.05 M-diethylamine and 0.2 M-sodium nitrite in citrate buffer showed an increase of N-nitrosodiethylamine when malondialdehyde or formaldehyde was added to the solution. Conversely, however, glucose had little effect on N-nitrosamine formation under the same conditions.

Surprisingly we have discovered that reducing sugars are effective in reducing n-nitrosamines when used in the curing of green bellies and, more surprisingly, we have discovered that reducing sugars in combination with liquid smoke will show dramatically greater reductions of N-nitrosamines than when reducing sugars or liquid smokes are added individually to pickle. Non-reducing sugars such as sucrose, however, have virtually no effect on N-nitrosamine formation.

The process of the present invention is practiced by injecting the bellies with the pickle. As noted above, conventional pickle contains water and a number of other ingredients such as sodium nitrite, sodium tripolyphosphate, sodium erythorbate and sodium chloride which are useful to cure the meat and to provide desirable flavor characteristics. A number of pickle compositions were used in developing the present invention. One such pickle comprised an aqueous solution of 2% sodium tripolyphosphate, 15% sodium chloride, 0.12% sodium nitrite and 0.6% sodium erythorbate monohydrate; however, these proportions and ingredients are not critical to the operability of the present invention and it is anticipated that the desired reduction of N-nitrosamines will be obtained when any conventional, stable nitrite-containing pickle is used in combination with a liquid smoke and one or more reducing sugars.

The amounts of liquid smoke and reducing sugars which are added to the pickle can vary depending on a number of factors, including the amount of pickle to be pumped into the green belly and flavor characteristics which are desired for the cooked bacon. However, we have found that when a quantity of pickle is pumped in concentration to provide 5–400 ppm of phenols, 10–2000 ppm of carbonyl compounds and 150–10,000 ppm of one or more reducing sugars based on the weight of the green belly, N-nitrosamine levels in the bacon when cooked for consumption will be reduced. To obtain superior flavor characteristics, the concentration range for the phenols will be 20–160 ppm, the concentration range for the carbonyls will be 10–800 ppm and the concentrtion range for the reducing sugars will be 500–6000 ppm. More preferably, these ranges will be 40–120 ppm, 30–360 ppm and 1000–3000 ppm, respectively.

Virtually any liquid smoke which can be pumped in pickle in combination with one or more reducing sugars at the above concentrations will give satisfactory results. It must be noted, however, that as the quantities of liquid smoke in the pickle are increased, solubility problems and other stability problems are often encountered which can interfere with the pumping process. Addition of acidic aqueous liquid smoke to pickle causes a rapid reduction in nitrite levels unless the pickle is buffered, and the buffer itself can have a detrimental affect on conventional liquid smoke because it can induce formation of an insoluble precipitate which can plug the injection needles. Furthermore, at higher concentrations, conventional liquid smokes with high carbonyl compound content tend to cause staining of the bacon. I have found that if the liquid smokes are pre-neutralized to avoid the aforementioned problems, a resinous precipitate forms which also can cause needle-plugging problems, and the resulting mixture may have undesirably reduced levels of phenols and carbonyls. Preneutralization is accomplished by adding a base such a sodium hydroxide to the acidic liquid smoke to bring the pH to ca 6–7 before it is added to the pickle.

Problems associated with oil-based liquid smokes also tend to make them less satisfactory than aqueous liquid smokes. The concentrations of the phenols and carbonyl compounds in the oil-based liquid smokes are substantially lower than those for the aqueous liquid smokes so that proportionally more of the oil-based smoke is required to obtain the same result. This concentration factor in combination with the fact that the oil is not readily miscible with pickle compounds the problems associated with the formation of an injectable liquid smoke solution and makes the use of oil-based liquid smokes less desirable.

another problem previously noted is the staining of the bellies by the carbonyl compounds found in the liquid smoke. This problem may be minimized by injecting an essentially uniform liquid smoke-reducing sugar-pickle combination in which the liquid smoke has relatively reduced levels of the color-forming consitutents. An appropriate solution may be prepared using Aro-Smoke, a product recently introduced by Red Arrow Products Company or, alternatively, the following procedure may be employed. An aqueous solution of wood smoke is prepared and refined by means well known in the art or, if so desired, a commercial aqueous wood smoke, such as Red Arrow's CharSol C-10, may be used as the starting solution. The pH of the solution is adjusted to ca 10–11 with an appropriate base, such as sodium hydroxide, and the mixture is extracted with diethyl ether to remove certain of the carbonyl-containing compounds. The aqueous solution is reacidified to a pH of ca 2–3 with an appropriate acid, such as hydrochloric acid, and the mixture is extracted with diethyl ether. After evaporation of the ether, a water-insoluble extract is obtained for which the ratio of carbonyl-containing compounds to phenolic constituents is in the range of 0.5–5 to 1. Preferably, this ratio will be in the range of 0.75–3 to 1 to obtain suppression of N-nitrosamines and superior flavor characteristics when the bacon is cooked for consumption.

Because the extract is water insoluble, a food grade emulsifier is required to obtain an injectable, preferably one-phase, mixture of the extract in pickle. A wide range of suitable emulsifiers is available and the effective amount of emulsifier required will depend on the characteristics displayed by each individual emulsifier. Polysorbate emulsifiers are generally satisfactory to practice the present invention and polysorbate 80 is particularly preferred when not less than 0.2% of emulsifier is used, based on the weight of the pickle solution. Certain other emulsifiers which provide suitable emulsification may also exhibit other characteristics which make them less desirable to use. Lecithin, for example, has been shown to increase N-nitrosopyrrolidine formation. Therefore, in view of the result which is to be achieved by utilizing the process of the present invention, emulsifiers which exhibit this tendency should be avoided.

To practice the present invention, a pickle is prepared by means well known in the art to preferably contain standard ingredients wuch as sodium nitrite, sodium erythorbate, sodium chloride, and perhaps a buffer such as sodium tripolyphosphate. To this solution is added the desired quantity of one or more reducing sugars and, as a final step, the solution is mixed with a liquid smoke to provide the desired levels of phenols and carbonyl-containing compounds.

The pickle may be either buffered or unbuffered. If is is unbuffered care must be taken to preneutralize the acidic liquid smoke with an appropriate base as previously described so that nitrite levels are not depleted; however, preneutralization will be unnecessary in virtually all instances if the pickle is buffered. Similar considerations also apply if an emulsifier is used to obtain an essentially uniform solution for injection.

To evaluate the improvement demonstrated by the present invention, belies were exposed to reducing sugars and a variety of liquid smokes. These included liquid smoke prepared according to the procedure described above, AroSmoke (which has properties comparable to liquid smoke prepared according to the above procedure) and several commercial liquid smokes. The following examples are illustrative.

EXAMPLES

Example 1

The phenolic- and carbonyl-compound content of several liquid smokes was determined so that an appropriate amount of liquid smoke could be added to the pickle. A sample analytical process is as follows.

A 200-ml quantity of CharSol C-10 was treated according to the procedure set forth above to give 8.4 g of oily extract. A 29% solution of the extract in polysorbate 80 was prepared and the phenolic- and carbonyl compound constituents of this smoke ("Prepared Smoke" as used in this Example) were assayed spectrophotometrically using 2,6-dimethoxyphenol and 2-butanone as the standards, respectively. From the assay results the carbonyl/phenol ratio was determined. Similar assays and ratio calculations were also made for Aro-Smoke (which contained ca 80% polysorbate), CharSol C-10, and Royal Smoke, another commercial aqueous liquid smoke from Griffith Laboratories. The following results were obtained.

| Sample | Phenols (mg/ml) | Carbonyls (mg/ml) | Ratio Carbonyls:Phenols |
|---|---|---|---|
| Prepared Smoke | 35 | 54 | 1.5:1 |
| Aro-Smoke | 39 | 54 | 1.4:1 |
| Royal Smoke | 7.5 | 79 | 10.5:1 |
| CharSol C-10 | 14 | 99 | 7.1:1 |

Example 2

Four curing pickles were prepared with the following compositions:

| | Percentage in Pickle | | | |
|---|---|---|---|---|
| Ingredient | Control | Glucose Test | Aro-Smoke Test | Combination Test |
| Water | 86.80 | 85.88 | 85.65 | 84.73 |
| Sodium Chloride | 11.54 | 11.54 | 11.54 | 11.54 |
| Sodium Tripolyphosphate | 1.15 | 1.15 | 1.15 | 1.15 |
| Sodium Erythorbate Monohydrate | 0.42 | 0.42 | 0.42 | 0.42 |
| Sodium Nitrite | 0.08 | 0.08 | 0.08 | 0.08 |
| Flavoring | 0.01 | 0.01 | 0.01 | 0.01 |
| Glucose | — | 0.92 | — | 0.92 |
| Aro-Smoke | — | — | 1.15 | 1.15 |

Fresh skin-on bellies were selected and each belly was pumped with one of the above pickle solutions at a level of 13% based on the weight of the meat; therefore, following pumping, the levels of phenolic compounds and carbonyl compounds in the bellies containg Aro-Smoke were 59 and 81 ppm, respectively, whereas the level of glucose in those bellies injected with glucose was 1200 ppm. The bellies were processed in a smokehouse according to a USDA approved procedure to effect curing and the resulting bacon was analyzed twelve times for nitrite content. In addition, bacon samples from each group were fried at 340° F. for three minutes per side, and the fried bacon was analyzed twelve times for N-nitrosamine content using N-nitrosopyrrolidine as the standard. The following results were obtained:

| Formula | Residual Nitrite (ppm)* | N-Nitrosopyrrolidine (ppb)* | % Reduction of N-Nitrosopyrrolidine Compared to Control |
|---|---|---|---|
| Control | 24 ± 14 | 16.5 ± 9 | — |
| Glucose Test | 17 ± 9 | 12.6 ± 7 | 24 |
| Aro-Smoke Test | 25 ± 9 | 12.2 ± 7 | 26 |
| Combination Test | 22 ± 11 | 6.6 ± 3 | 60 |

*Data represent the mean ± the standard deviation from N = 12 different determinations These results show that the N-nitrosamine levels in the fried bacon which had been injected with Combination Test solution according to the present invention were markedly lower than the levels found for the Control, the Glucose Test solution or the Aro-Smoke Test solution. Furthermore, residual nitrite was not significantly reduced.

Similarly prepared bacon samples were tested in consumer studies conducted under scientifically controlled conditions at a central location with 1200 bacon users. The taste preferences determined by this study are shown below and clearly indicate that bacon injected with Combination Test solution was preferred by the consumers.

| | Overall Preference | |
|---|---|---|
| Formula | Preferred Control | Preferred Test Solution |
| Control vs. Glucose Test | 49% | 51% |
| Control vs. Combination Test | 34% | 66% |

Example 3

Four curing pickles were prepared with the following compositions:

| | Percentage in Pickle | | | |
|---|---|---|---|---|
| Ingredient | Control | Glucose Test | Aro-Smoke Test | Combination Test |
| Water | 87.47 | 85.93 | 86.70 | 85.55 |
| Sodium Chloride | 11.54 | 11.54 | 11.54 | 11.54 |
| Sodium Tripolyphosphate | 0.48 | 0.48 | 0.48 | 0.48 |
| Sodium Erythorbate Monohydrate | 0.42 | 0.42 | 0.42 | 0.42 |
| Sodium Nitrite | 0.08 | 0.08 | 0.08 | 0.08 |
| Flavoring | 0.01 | 0.01 | 0.01 | 0.01 |
| Glucose | — | 1.54 | — | 1.15 |
| Aro-Smoke | — | — | 0.77 | 0.77 |

Fresh skin-on bellies were selected and each belly was pumped with one of the above pickle solutions at a level of 13% based on the weight of the meat; therefore, following pumping, the levels of phenolic compounds and carbonyl compounds in the bellies containing Aro-Smoke were 39 and 54 ppm, respectively. The level of glucose in the bellies injected with Glucose Test solution was 2000 ppm whereas that in bellies injected with Combination Test solution was 1500 ppm. The bellies were processed in a smokehouse according to a USDA approved procedure to effect curing and the resulting bacon was analyzed six times for nitrite content. In addition, samples were fried as described in Example 1 and then analyzed for N-nitrosamine content. The following results were obtained:

| Formula | Residual Nitrite (ppm)* | N-Nitrosopyrrolidine (ppb)** | % Reduction of N-Nitrosopyrrolidine Compared to Control |
|---|---|---|---|
| Control | 31 ± 5 | 18 ± 6 | — |
| Glucose Test | 32 ± 8 | 12 ± 5 | 33 |
| Aro-Smoke Test | 23 ± 7 | 10 ± 6 | 44 |
| Combination Test | 22 ± 9 | 7 ± 3 | 61 |

*Data represent the mean ± the standard deviation from N = 6 different determinations

**Data represent the mean ± the standard deviation from N = 12 different determinations Similarly prepared bacon samples were tested in consumer studies conducted with randomly selected bacon users. The test protocol involved a hedonic scoring system in which 1=disliked extremely and 9=liked extremely to evaluate flavor and overall acceptability. The results which follow show statistically significant differences ($p \leq 0.05$) between product prepared with Control and product prepared according to the present invention.

| | Test Scores | |
|---|---|---|
| Curing Solution | Flavor | Overall Preference |
| Control | 5.5 | 5.4 |
| Combination Test | 6.8 | 6.6 |

Example 4

The following experiment was carried out using CharSol C-10 which had been preneutralized so as to avoid nitrite depletion when the liquid smoke was added to the pickle. Neutralization was accomplished by adding sodium hydroxide in a stepwise manner until the pH was 6 to 7. Considerable precipitation was encountered and only the soluble supernatant was used in the experiment.

Four curing pickles were prepared with the following compositions:

| | Percentage in Pickle | | | |
|---|---|---|---|---|
| Ingredient | Control | Fructose Test | CharSol C-10 Test | Combination Test |
| Water | 81.83 | 76.83 | 76.83 | 71.83 |
| Sodium Chloride | 15.00 | 15.00 | 15.00 | 15.00 |
| Sodium Tripolyphosphate | 2.50 | 2.50 | 2.50 | 2.50 |
| Sodium Erythorbate Monohydrate | 0.54 | 0.54 | 0.54 | 0.54 |
| Sodium Nitrite | 0.11 | 0.11 | 0.11 | 0.11 |
| Flavoring | 0.02 | 0.02 | 0.02 | 0.02 |
| Fructose | — | 5.00 | — | 5.00 |
| Preneutralized CharSol C-10 | — | — | 5.00 | 5.00 |

Fresh skin-on bellies were selected and each belly was pumped with one of the above pickle solutions at a level of 10% based on the weight of the meat. Therefore, based on an analysis of the supernatant which was added to the pickle, the levels of phenolic compounds and carbonyl compounds in the bellies containing liquid smoke were 16 ppm and 210 ppm, respectively, following pumping, whereas the level of fructose in those bellies injected with Fructose Test solution or Combination Test solution was 5000 ppm. The bellies were processed and analyzed as previously described to give the following results:

| Formula | Residual Nitrite (ppm)* | N-Nitroso-pyrrolidine (ppb)** | % Reduction of N-Nitrosopyrrolidine Compared to Control |
|---|---|---|---|
| Control | 32 ± 10 | 42 ± 27 | — |
| Fructose Test | 41 ± 9 | 12 ± 7 | 71 |
| CharSol C-10 Test | 26 ± 7 | 20 ± 4 | 52 |
| Combination Test | 23 ± 1 | 6 ± 2 | 86 |

*Data represent the mean ± the standard deviation from N = different determinations
**Data represent the mean ± the standard deviation from N = 5 different determinations My invention is not restricted solely to the descriptions and illustrations provided above, but encompasses all modifications envisaged by the following claims.

I claim:

1. A process for preparing cured bacon which, when cooked for consumption, contains substantially reduced levels of N-nitrosamines, said process comprising the steps of
    preparing a nitrite-stable injectable curing solution comprising
        a nitrite-containing pickle,
        a liquid smoke in concentration to provide 5 to 400 ppm phenols and 10 to 2000 ppm carbonyl compounds, based upon the green weight of the belly to be injected, and
        from 150 to 10,000 ppm of reducing sugar, based upon the green weight of the belly to be injected;
    injecting said curing solution into a green belly; and
    processing said belly to effect curing.

2. The invention as disclosed in claim 1 wherein said pickle is buffered to stabilize the nitrite.

3. The invention as disclosed in claim 2 wherein the buffer is sodium tripolyphosphate.

4. The invention as disclosed in claim 1 wherein said pickle is unbuffered and said liquid smoke is preneutralized to avoid nitrite depletion in the unbuffered pickle.

5. The invention as disclosed in claim 1 wherein said liquid smoke is in concentration to provide 20–160 ppm of phenols and 10–800 ppm of carbonyls based on the green weight of the belly, and said reducing sugar is in concentration to provide 500–6000 ppm based on the green weight of the belly.

6. The invention as disclosed in claim 1 wherein said liquid smoke is in concentration to provide 40–120 ppm of phenols and 30–360 ppm of carbonyls based on the green weight of the belly, and said reducing sugar is in concentration to provide 1000–3000 ppm based on the green weight of the belly.

7. A process for preparing cured bacon which, when cooked for consumption, contains substantially reduced levels of N-nitrosamines, said process comprising the steps of
    preparing a nitrite-stable injectable curing solution comprising
        a nitrite-containing pickle,
        a liquid smoke in concentration to provide 5 to 400 ppm phenols and 10 to 2000 ppm carbonyl compounds, based upon the green weight of the belly to be injected, the ratio of carbonyls to phenols being within the range of 0.5–5 to 1,
        from 150 to 10,000 ppm of reducing sugar, based upon the green weight of the belly to be injected; and
        an effective amount of a food grade emulsifier which does not substantially increase N-nitrosamine formation;
    injecting said curing solution into a green belly; and
    processing said belly to effect curing.

8. The invention as disclosed in claim 7 wherein said pickle is buffered to stabilize the nitrite.

9. The invention as disclosed in claim 8 wherein the buffer is sodium tripolyphosphate.

10. The invention as disclosed in claim 7 wherein said pickle is unbuffered and said liquid smoke is preneutralized to avoid nitrite depletion in the unbuffered pickle.

11. The invention as disclosed in claim 7 wherein the ratio of carbonyl to phenolic compounds is within the range of 0.75–3 to 1.

12. The invention as disclosed in claim 11 wherein said liquid smoke is in concentration to provide 20–160 ppm of phenols and 10–800 ppm of carbonyls based on the green weight of the belly, and said reducing sugar is in concentration to provide 500–6000 ppm based on the green weight of the belly.

13. The invention as disclosed in claim 12 wherein said food grade emulsifier is a polysorbate emulsifier.

14. The invention as disclosed in claim 12 wherein said food grade emulsifier is polysorbate 80.

15. The invention as disclosed in claim 11 wherein said liquid smoke is in concentration to provide 40-120 ppm of phenols and 30-360 ppm of carbonyls based on the green weight of the belly, and said reducing sugar is in concentration to provide 1000-3000 ppm based on the green weight of the belly.

* * * * *